July 2, 1935.  M. SCHÄFER  2,006,723

SHUTTLE DRIVE

Filed Nov. 3, 1932  2 Sheets-Sheet 1

Inventor.
Max Schäfer

July 2, 1935.  M. SCHÄFER  2,006,723
SHUTTLE DRIVE
Filed Nov. 3, 1932  2 Sheets-Sheet 2

Inventor.

Max Schäfer

Patented July 2, 1935

2,006,723

UNITED STATES PATENT OFFICE 2,006,723

SHUTTLE DRIVE

Max Schäfer, Ohorn, near Pulsnitz, Germany

Application November 3, 1932, Serial No. 641,069
In Germany April 22, 1932

1 Claim. (Cl. 139—138)

This invention relates to a shuttle drive in ribbon looms.

In order to attain a variable and positive shuttle motion in ribbon looms it has been proposed already to provide for the drive of the shuttle from the main shaft by means of an eccentric wheel, and elliptic wheel in mesh therewith and a crank guide, the crank guide with the necessary bearings, transmission levers and the like being in this case disposed on the oscillating slay and all these parts participating in the oscillation of the latter, so that considerable pressure due to inertia has to be overcome while, owing to lack of space, it is impossible to attain large working paths of the rack for the shuttles.

According to the invention, all transmission parts are arranged on the loom frame in a stationary manner and the slay carries merely an oscilatory bearing in which a toothed wheel is rotatably disposed. This toothed wheel, which may be of any size, is axially displaceably positioned on the slotted end of a shaft to which a swinging motion is imparted by a toothed wheel and a crank guide driven at a periodically varying speed. By enlarging the toothed wheel axially displaceably on the shaft it becomes possible to attain very long working paths of the rack for the shuttles notwithstanding the restricted stroke of the crank guide. Furthermore, since the parts secured to the slay represent only a very small inertia mass and all other parts are stationarily disposed on the stationary part of the loom, few intermediate members are needed and very steady and shockless running of the loom even at higher picking speeds is thus insured.

Figure 1:
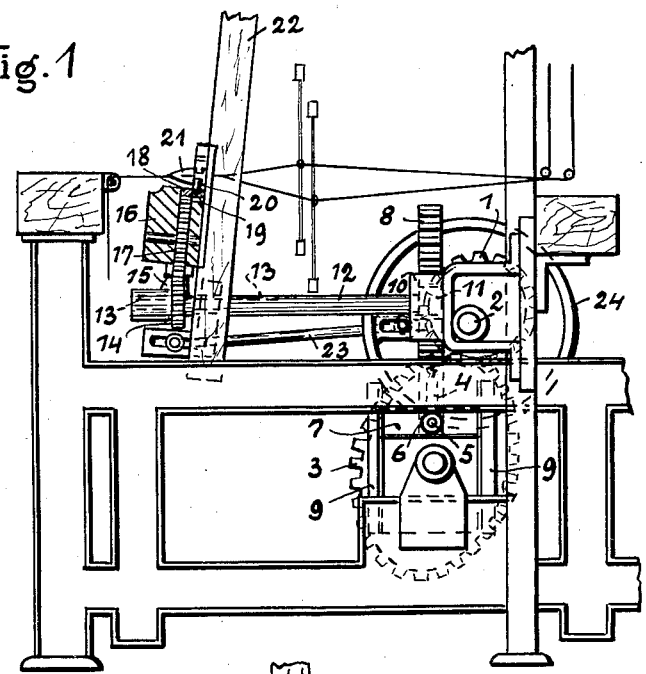
Figure 2:
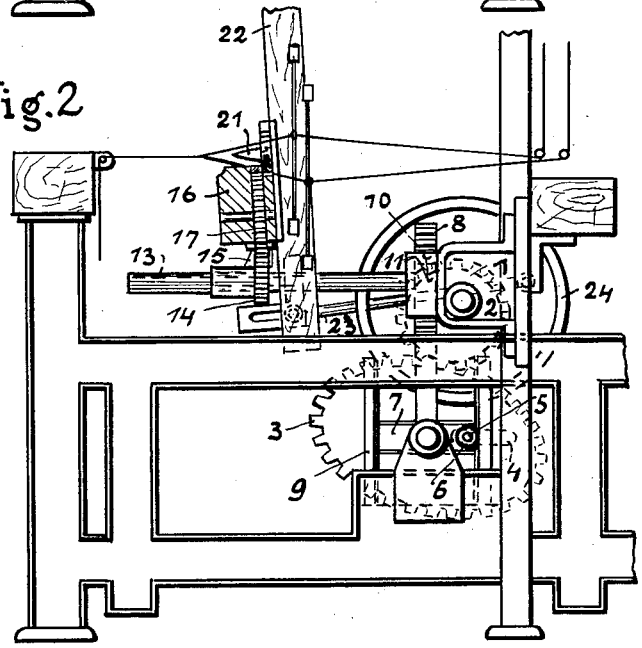
Figure 3:
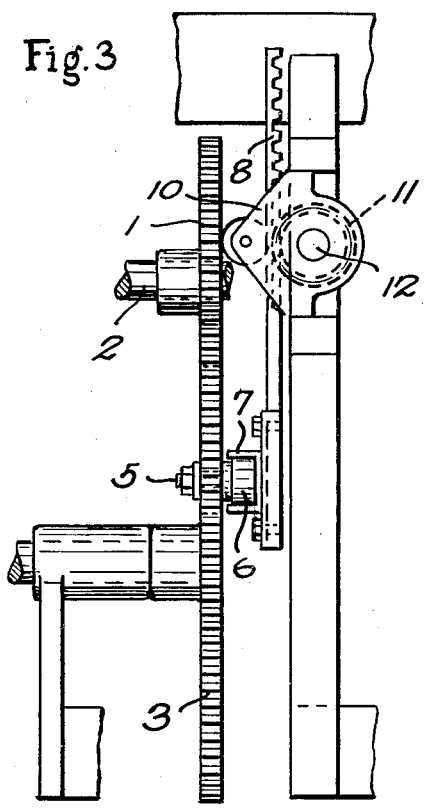
Figure 4:
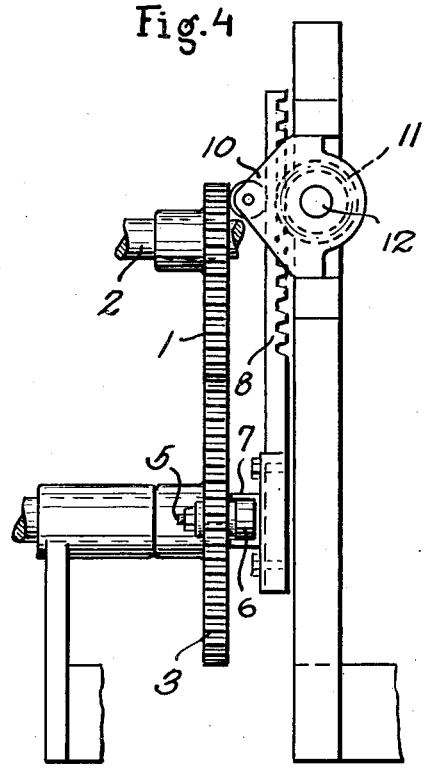
Figure 5:
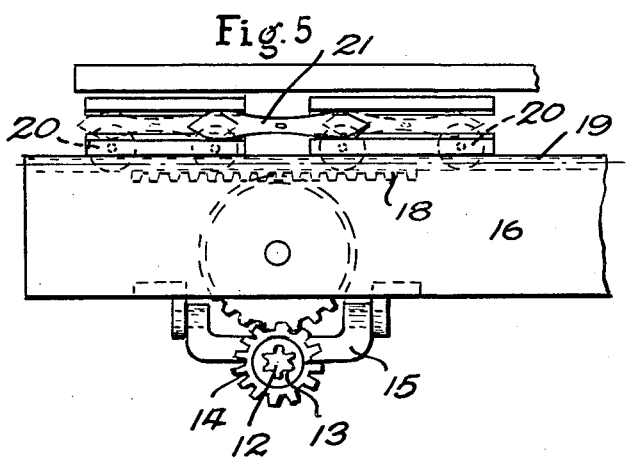
Figure 6:
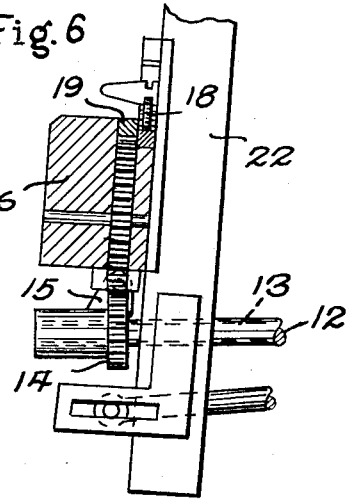

By way of example, the invention is illustrated in the accompanying drawings, in which Figures 1 and 2 are side views showing the shuttle driving means in different positions with parts of the loom; Figs. 3 and 4, front views of the driving wheels in different positions; Fig. 5 is a front view of the slay cheek and the driving members for the shuttle; and Fig. 6, a view of the slay cheek on an enlarged scale.

Referring to the drawings, the slay driving shaft 2 carries an eccentric wheel 1 and is in mesh with the elliptical wheel 3 having twice the number of teeth of the wheel 1. On the elliptical wheel 3, in the guide 4, the crank pin 5 with the roller 6 is adjustably disposed, and the roller 6 engages the crank guide 7 rectangularly, or slightly obliquely, positioned on the rack 8, the crank guide 7 with the rack 8 being vertically arranged in the parallel guides 9 and the bearings 10. The rack 8 is engaged by a toothed wheel 11 secured to one end of the shaft 12 whose other end is slotted at 13 and carries the axially displaceable toothed wheel 14 which is disposed in the bearing 15 positioned on the slay 16 and cooperating in the oscillation thereof. By means of the intermediary wheel 17 and the toothed member 18, the wheel 14 drives the rack 19 which in turn drives the small toothed wheels 20 for moving the shuttle 21. The slay 16 is secured to the arms 22 oscillatorily suspended in the loom frame and reciprocated from the flywheel 24 by means of the connecting rod 23.

The drive functions as follows:

When the shaft 2 makes a quarter turn from the forward dead center, as indicated in Fig. 2, the elliptical wheel 3 and the roller 6 will rotate very slightly, their rotation amounting to approximately one-twenty-fourth of a revolution, so that the rack 8 and the shuttles 21 will be displaced almost imperceptibly. If the shaft 2 turns for another quarter, the movement of the elliptical wheel 3, owing to the constant variation in the gear ratio of the wheels 1 and 3, will be accelerated, which involves the acceleration of the shuttle 21 which during this time passes into the center of the shed, as indicated by the dotted line in Fig. 5. During the subsequent third quarter turn of the shaft 2, the shuttle 21 will be brought almost into its end positon, as shown to the left in Fig. 5, while the acceleration constantly decreases. The last quarter turn of the main shaft 2 has the same effect as the first quarter turn, though in opposite manner, and practically means that the rack and shuttle are in a position of rest. The entire motion of the shuttle 21 is therefore effected by half a turn of the main shaft 2 in a perfectly positive and shockless way, whereas the other half turn of the shaft 2 leaves the shuttle practically in a position of rest, and is positively controlled also.

I claim:—

A shuttle drive for ribbon looms, in which driving is effected by means of an eccentric wheel, an elliptical wheel and a crank guide, comprising a frame, a crank guide in the said frame, a driving shaft for the slay, an eccentric wheel on the said shaft, an elliptical wheel in mesh with the said eccentric wheel, a crank pin and a roller adjustable in a guide on the said elliptical wheel, the said roller engaging the said crank guide, a rack connected with the said crank guide, a toothed wheel in mesh with the said rack, a shaft carrying the said toothed wheel on one end and having its other end slotted, a second toothed wheel axially displaceable on the slotted end of the said shaft, an oscillatory bearing for the said second toothed wheel on the slay of the loom, a rack, and an intermediate wheel in mesh with the said second toothed wheel and the said rack for driving the shuttle.

MAX SCHÄFER.